April 15, 1952 J. V. FERRARO 2,592,880
MACHINE FOR ERECTING COLLAPSED CARTONS
Filed Sept. 17, 1947 12 Sheets-Sheet 1

Inventor:
Joseph Vincent Ferraro
By: Wallace and Cannon
Attorneys

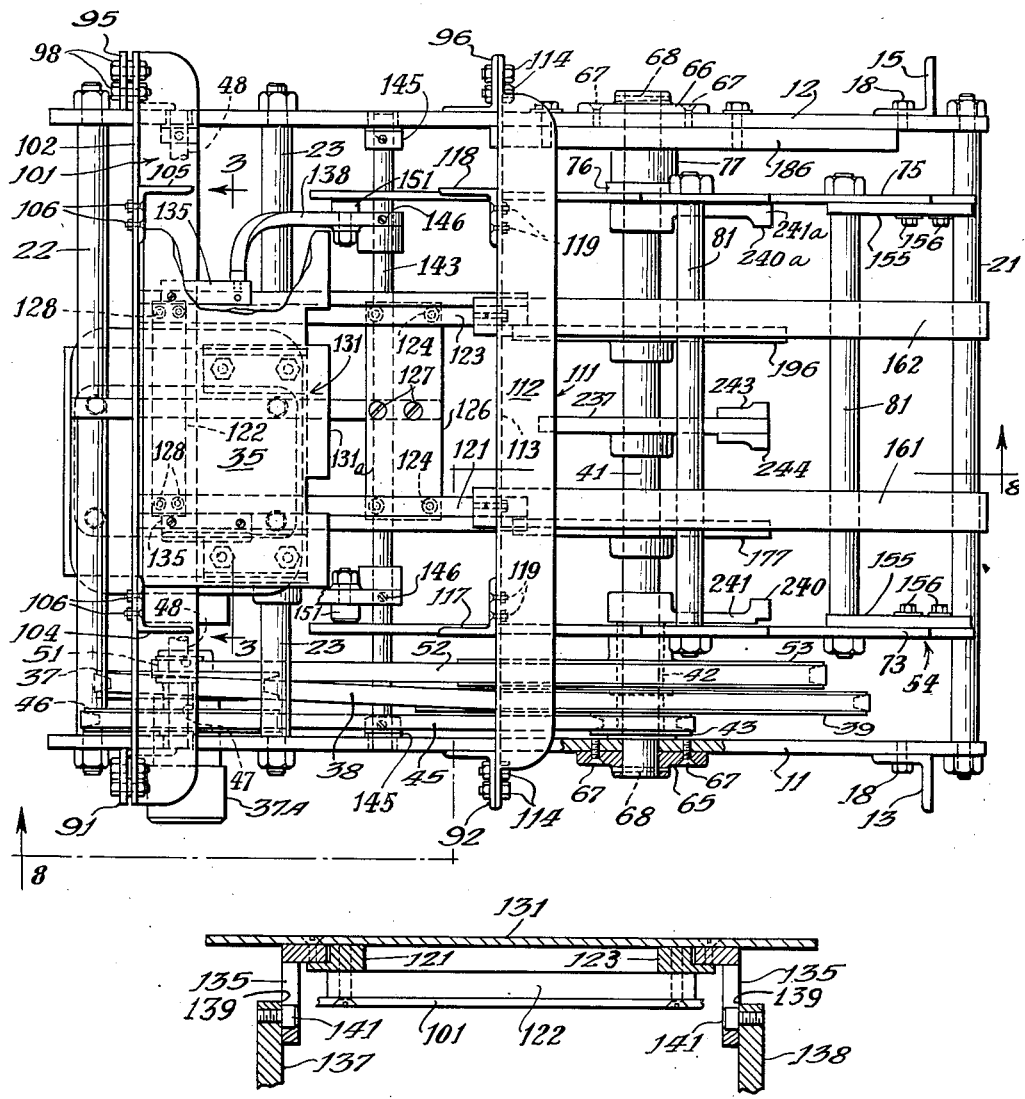

April 15, 1952      J. V. FERRARO      2,592,880
MACHINE FOR ERECTING COLLAPSED CARTONS
Filed Sept. 17, 1947      12 Sheets-Sheet 3
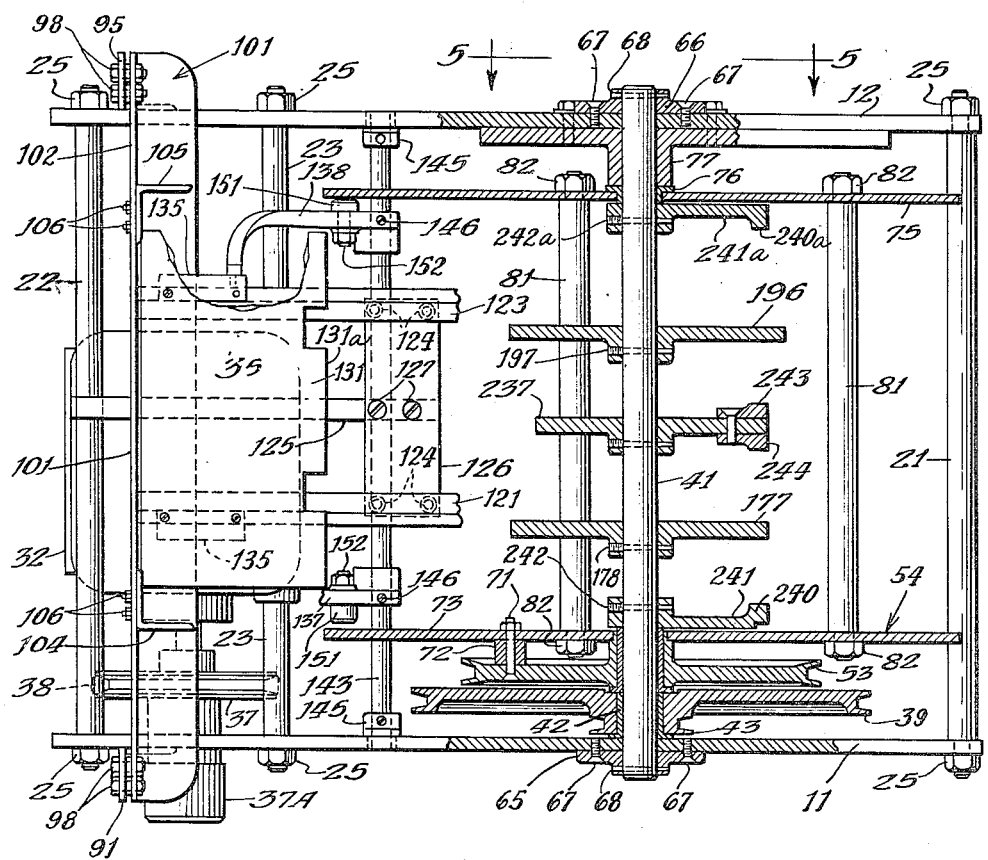
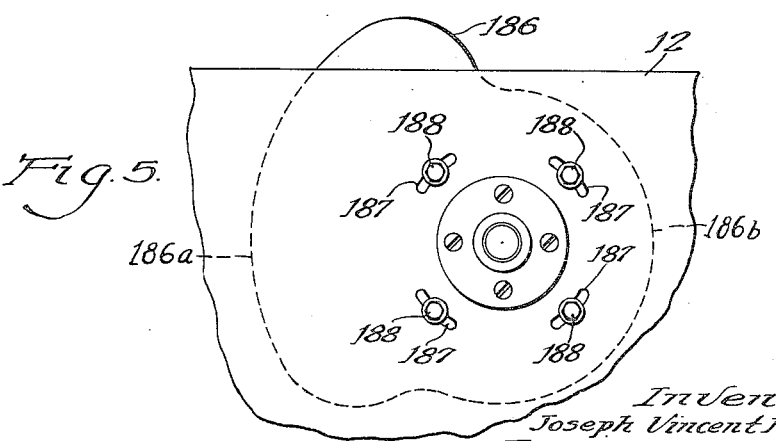
Inventor:
Joseph Vincent Ferraro
By: Wallace and Cannon
Attorneys

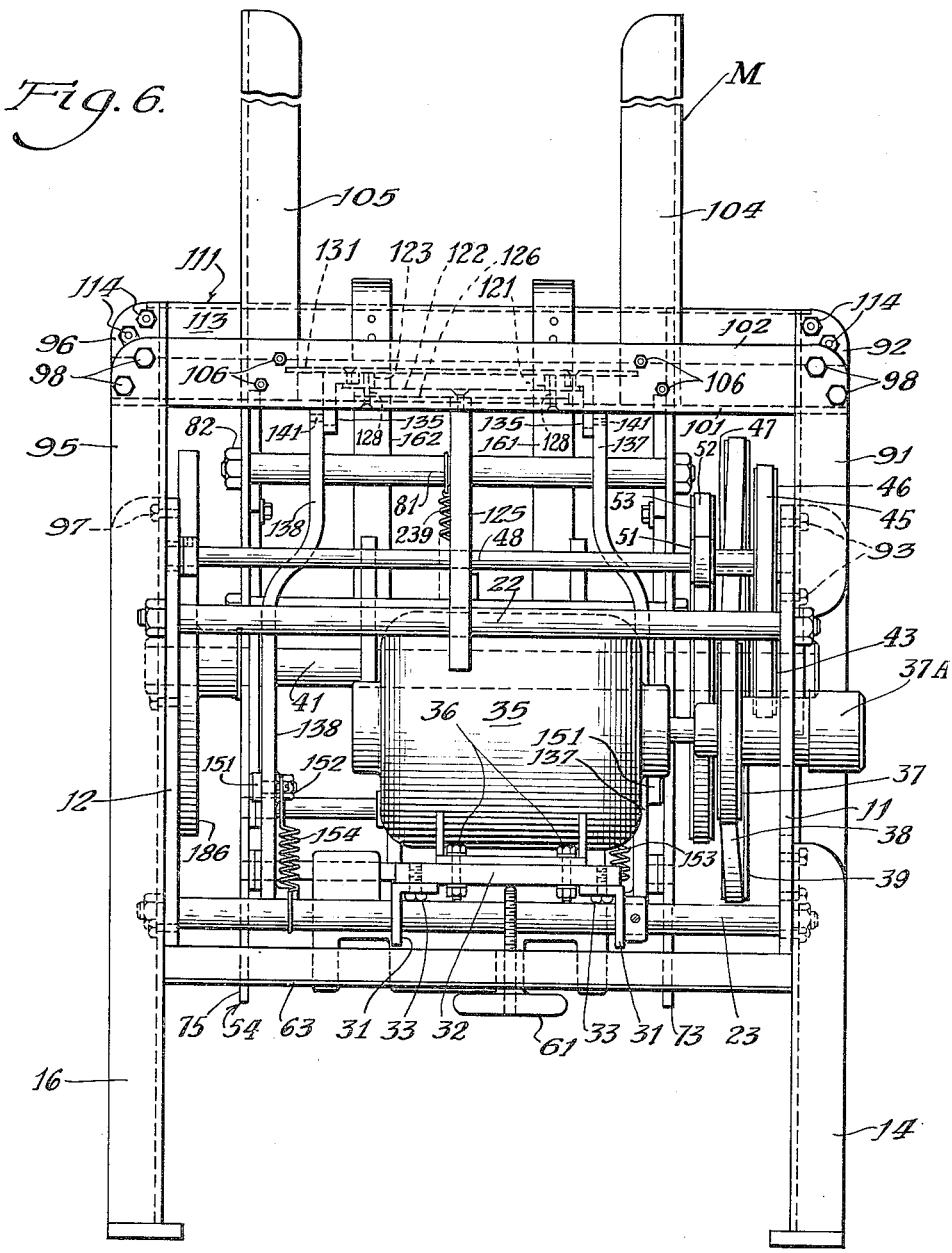

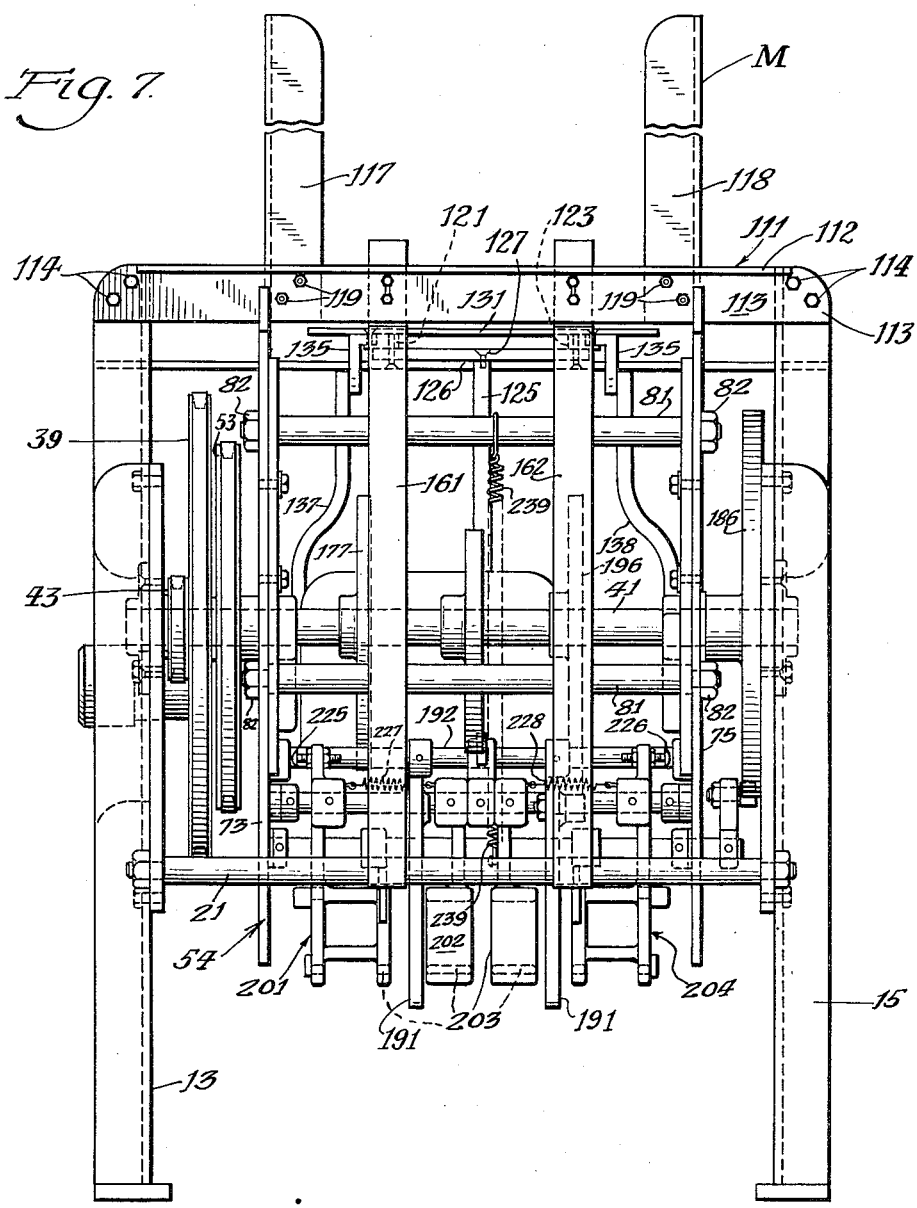

April 15, 1952     J. V. FERRARO     2,592,880
MACHINE FOR ERECTING COLLAPSED CARTONS
Filed Sept. 17, 1947     12 Sheets-Sheet 6

Inventor
Joseph Vincent Ferraro
By:
Wallace and Cannon
Attorneys

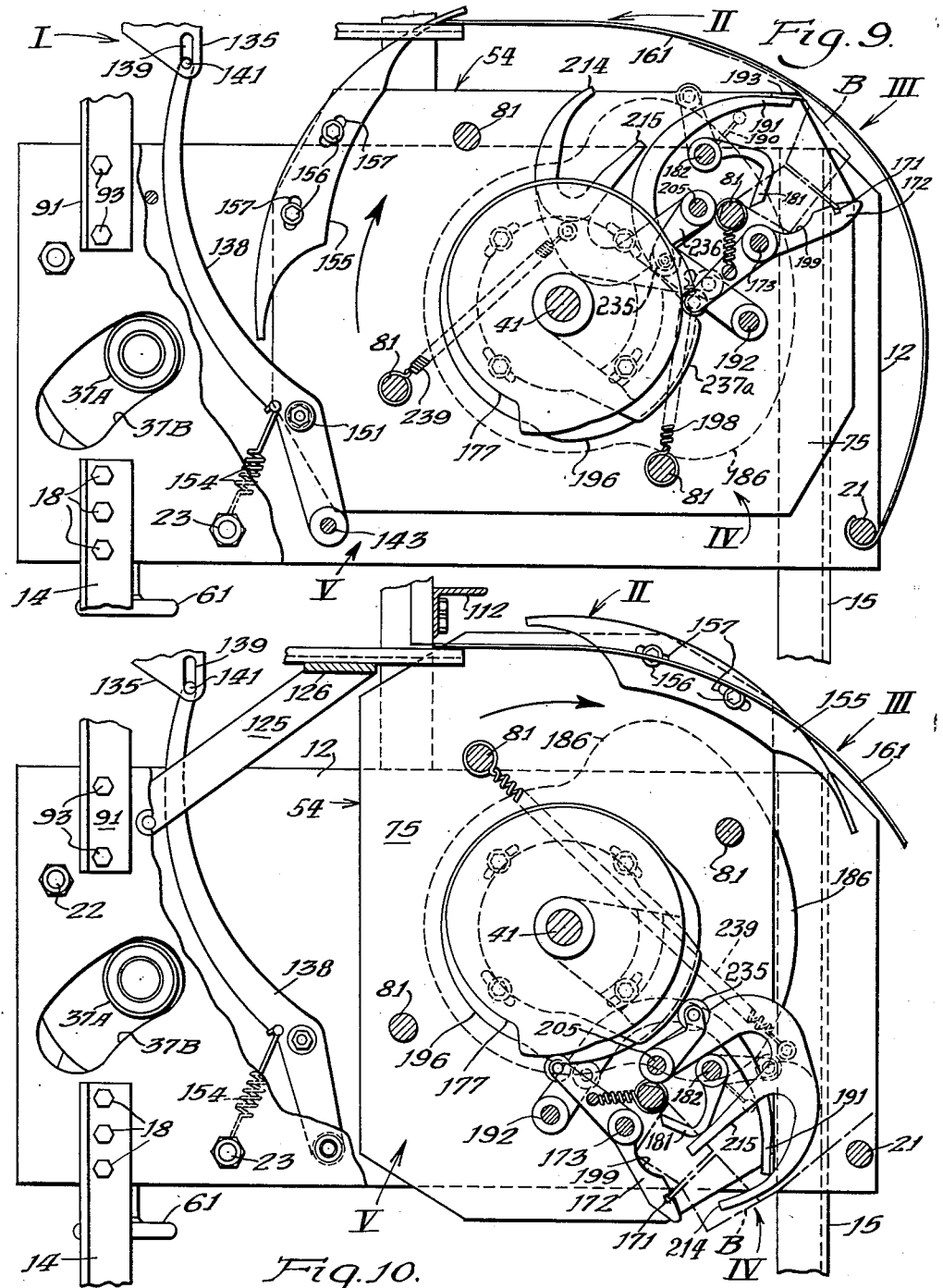

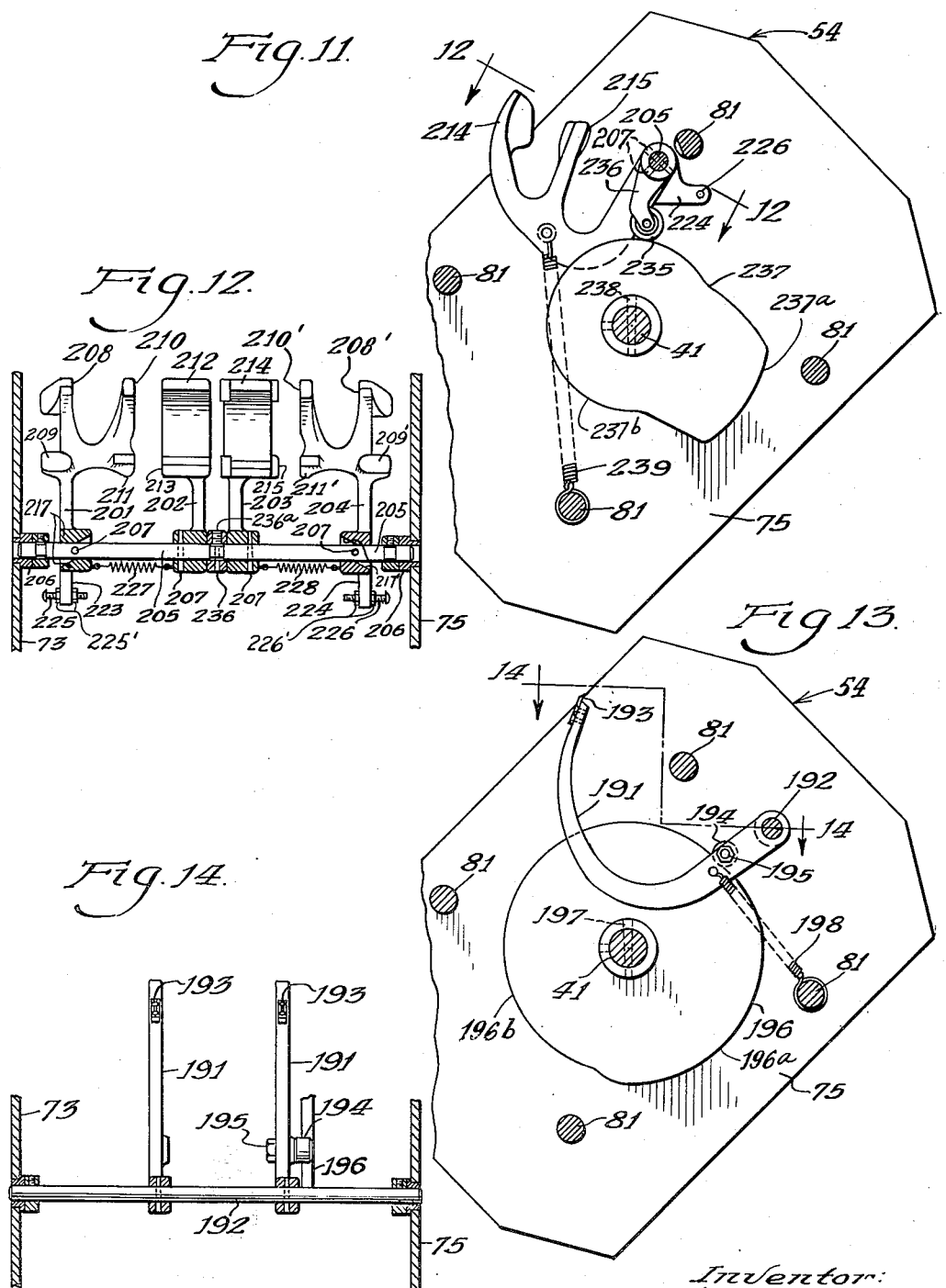

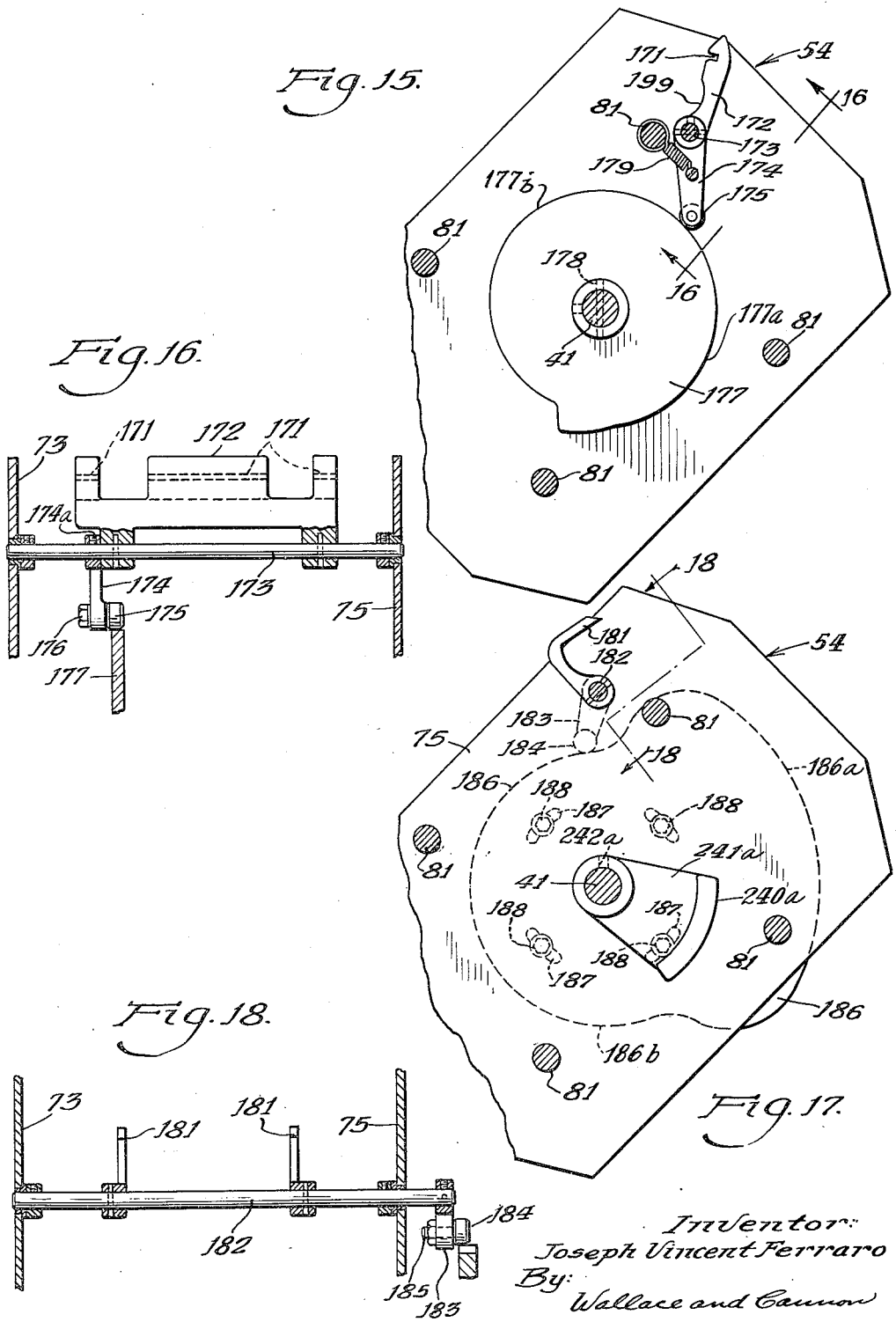

April 15, 1952      J. V. FERRARO      2,592,880
MACHINE FOR ERECTING COLLAPSED CARTONS
Filed Sept. 17, 1947      12 Sheets-Sheet 10

Inventor:
Joseph Vincent Ferraro
By: Wallace and Cannon
Attorneys

April 15, 1952 J. V. FERRARO 2,592,880
MACHINE FOR ERECTING COLLAPSED CARTONS
Filed Sept. 17, 1947 12 Sheets-Sheet 11
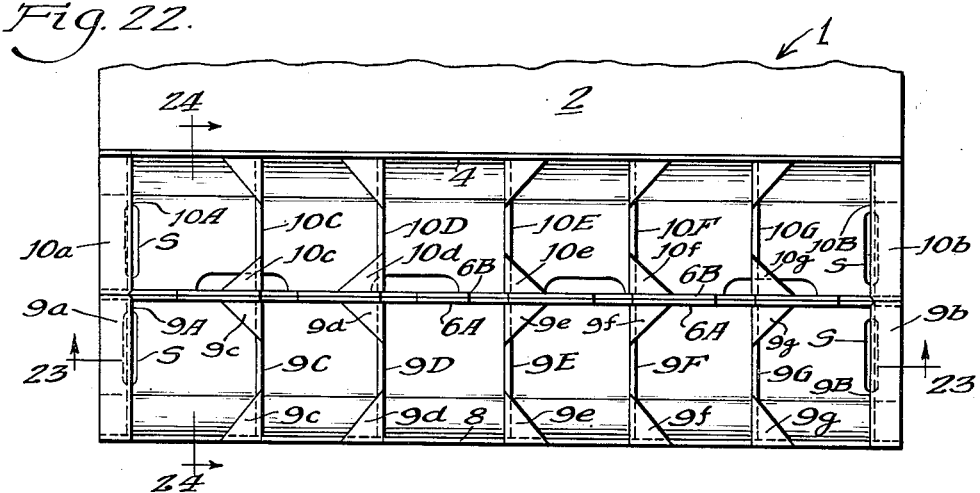
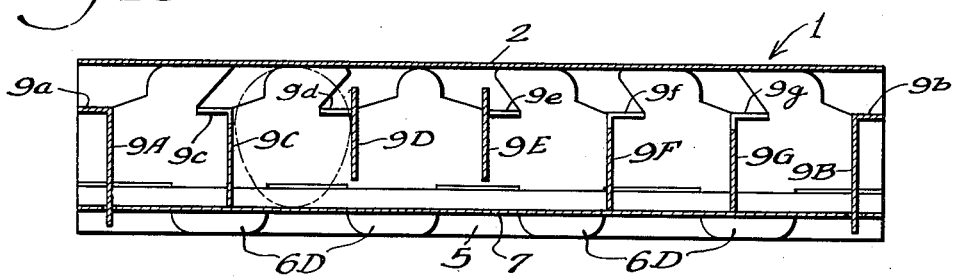
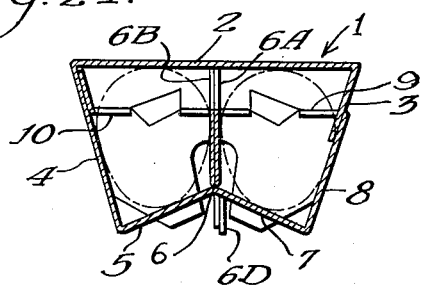
Inventor:
Joseph Vincent Ferraro
By Wallace and Cannon
Attorneys

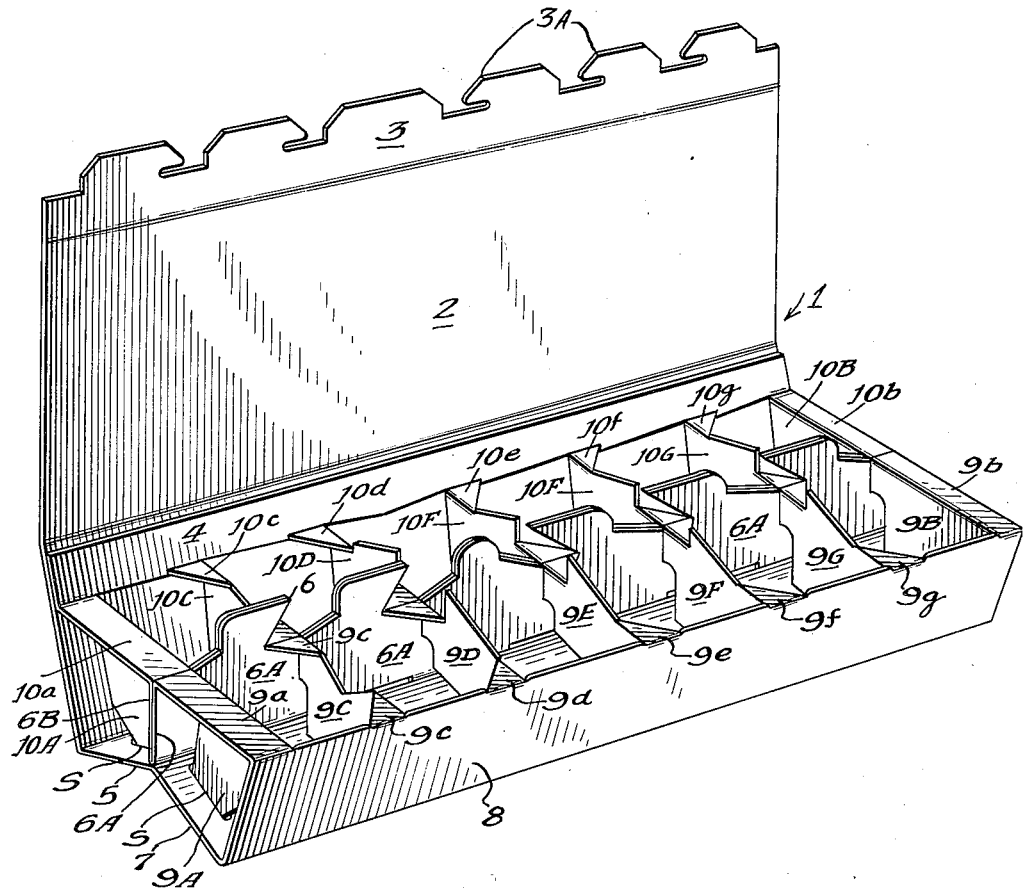

Patented Apr. 15, 1952

2,592,880

UNITED STATES PATENT OFFICE 2,592,880

MACHINE FOR ERECTING COLLAPSED CARTONS

Joseph Vincent Ferraro, New York, N. Y., assignor to Empire Box Corporation, Garfield, N. J., a corporation of Delaware Application September 17, 1947, Serial No. 774,491

24 Claims. (Cl. 93—37)

This invention relates to carton machines and more particularly to machines for opening and erecting egg cartons and the like to prepare them for filling.

During recent years the practice of packaging eggs in lots of a dozen for the retail trade has increased very greatly and a number of cartons for such packaging have been successfully introduced. For economy in handling and shipping, such cartons are commonly prepared in knock-down or collapsed condition, requiring that they be opened and erected before they can be filled with eggs. The cartons in use have varied somewhat in their construction and various devices, usually peculiarly adapted for use with particular cartons, have been designed to assist in the opening and erection of such cartons. Some of these devices have been merely stationary blocks or holders which are of assistance in the manual erection of cartons. Others have been semi-automatic in operation, and a few have been entirely automatic, an example of the latter being the machine described in Burger Patent No. 2,018,396, patented October 22, 1935. Most of these devices, however, have been open to certain objections in that they are limited to use with a very specific carton construction, or they are slow, cumbersome, or unreliable in operation, they require complex mechanical elements, or they involve reciprocating parts which necessitate operation at a relatively slow rate to avoid injury to the carton.

Generally speaking, one-piece cartons of the type providing partitions and capacity for two rows of six eggs each appear to have received the highest public favor. These cartons are commonly referred to as "two by six" cartons and certain of them have the very important advantage that they can be prepacked and encased in standard egg cases of the 15-dozen or 30-dozen size, without necessitating transfer of eggs from standard cases to dozen-size cartons, as has been commonly required with some types of retail size cartons. Hence cartons of the type referred to, and for which the apparatus of the present invention is particularly suited, may be originally packed and boxed in standard egg cases, further handling or transfer of eggs not being required at the point of retail.

A carton of the character just described is disclosed and claimed in a copending application for United States Letters Patent, by William H. Allen, Serial No. 583,988, filed March 21, 1945. The carton described in said application is formed in one piece by cutting, folding and gluing a blank sheet of cardboard or other suitable paper stock or fibre stock. Said carton is normally supplied to the trade in flat-folded or collapsed form, to conserve shipping and storage space until it is to be filled. Prior to filling, the carton must be opened and erected. The carton referred to, when erected, consists of a double tubular longitudinal construction having solid front and rear walls, a cover flap integral with and directly attached to the rear wall, a slotted bottom wall for each half or tubular element, a longitudinal partition wall of double thickness secured at the bottom to the juncture line of the two halves of the bottom wall and provided with extending supporting feet elements, and a top wall consisting mainly of hinged transverse partition elements each adapted to be swung down to a vertical position where a tab portion thereon snaps into a slot in the bottom wall. This particular carton has certain meritorious features and modifications enumerated in said Allen application and it is an object of the present invention to erect cartons of the type therein described by simple and completely automatic mechanism. It will be understood, however, that the present invention is not necessarily limited to use with cartons of the precise character described in said Allen application.

Another object of the present invention is to feed collapsed cartons of the general character described hereinabove to and through mechanism which operates on the carton during continuous travel thereof to separate its collapsed walls, orient them to their final desired positions, and rotate transverse partition elements into their final positions.

Still another object is to open and erect a carton of the general character described hereinabove by means of travelling opening and folding elements controlled by stationary cam mechanism.

A further object is to mount necessary opening and folding elements, for the purpose described above, in a continuously revolving drum or cage structure and to place control cams for the various parts within such structure.

A still further object is to design and assemble the necessary operating elements for feeding, opening and erecting collapsed cartons of the above described character in a novel manner to operate efficiently in a simple and compact mechanism.

Other and further objects of the present invention will be apparent from the following description and claims and are illustrated in the accompanying drawings which, by way of illustration, show a preferred embodiment of the present invention and the principle thereof and what I now consider to be the best mode in which I have contemplated applying that principle. Other embodiments of the invention embodying the same or equivalent principles may be used and structural changes may be made as desired by those skilled in the art without departing from the present invention and the purview of the appended claims.

In the drawings:

Fig. 2 is a top plan view of the machine shown in Fig. 1.

Fig. 3 is a vertical sectional detail view taken substantially along the line 3—3 Fig. 2.

Fig. 4 is a horizontal sectional view through the machine taken substantially along the line 4—4 Fig. 1.

Fig. 5 is a detail view in elevation taken substantially along the line 5—5 Fig. 4.

Fig. 6 is a rear elevational view of the machine.

Fig. 7 is a front elevational view of the machine.

Fig. 9 is a view similar to Fig. 8 showing certain operating parts in another position.

Fig. 10 is another view similar to Fig. 8 showing operating parts in still another position.

Fig. 11 is a detail sectional view taken through a cage structure which supports and carries certain folding elements.

Fig. 12 is a sectional view taken substantially along the line 12—12 in Fig. 11 showing the construction of certain folding elements.

Fig. 13 is another sectional view through the cage structure showing other operating elements.

Fig. 14 is a detail view taken substantially along the line 14—14 in Fig. 13.

Fig. 15 is still another sectional view through the cage structure showing still another operating element.

Fig. 16 is a detail view taken substantially along the line 16—16 in Fig. 15.

Fig. 17 is still another sectional view showing other operating elements carried by the cage structure; and Fig. 18 is a detail view taken substantially along the line 18—18 in Fig. 17.

Fig. 22 is a plan view similar to Fig. 21 but showing the transverse partitions erected and the carton fully set up for filling;

Fig. 23 is a longitudinal sectional view through the carton of Fig. 22, taken substantially along the line 23—23, Fig. 22;

Fig. 24 is a transverse sectional view, taken substantially along the line 24—24, Fig. 22, and Fig. 25 is a perspective of the fully erected carton.

Figure 1:
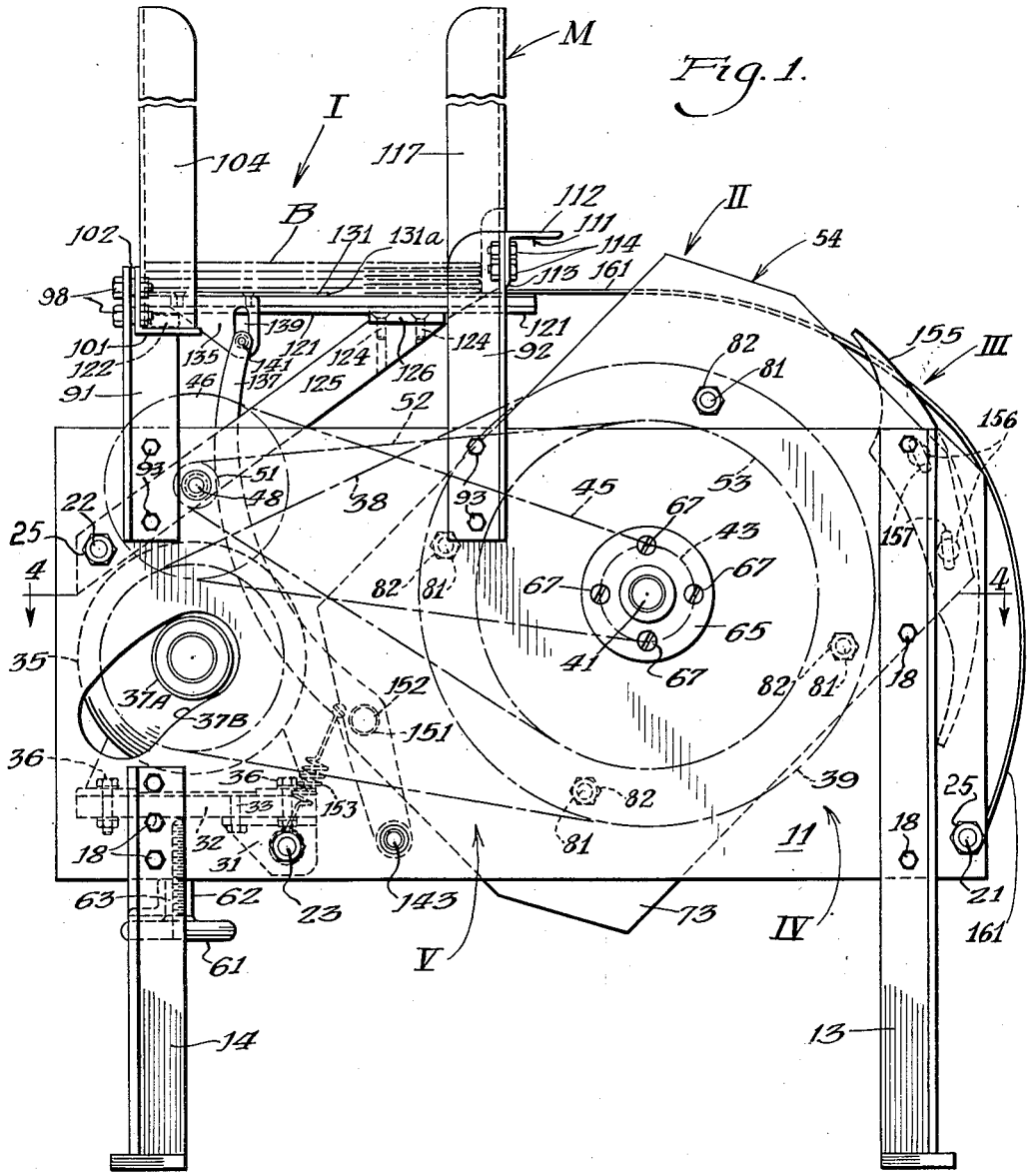
Fig. 1 is a side elevational view of a carton erecting machine embodying my invention.

The machine of the present invention is adapted to set up cartons of the general type disclosed in the aforesaid copending application of William H. Allen, Serial No. 583,988, filed March 21, 1945 and which discloses a number of modifications of egg cartons, one of which is illustrated in Figs. 19 to 25 of the drawings herein, for illustrative purposes. It will be noted that reference is made to the copending Allen application merely to illustrate the general type of carton my novel machine is adapted to set up and that my invention is not limited thereto.

Referring to Figs. 19 to 25, there is disclosed a collapsible carton 1 having a cover flap 2 provided with a flange 3 which may include a series of locking tabs 3A. The carton comprises a rear wall 4, a rear bottom wall 5, a longitudinal partition 6 which is of double thickness, comprising a front sheet 6A and a rear sheet 6B, a front bottom wall 7, a front wall 8, a front top wall 9, and rear top wall 10.

Figure 21:
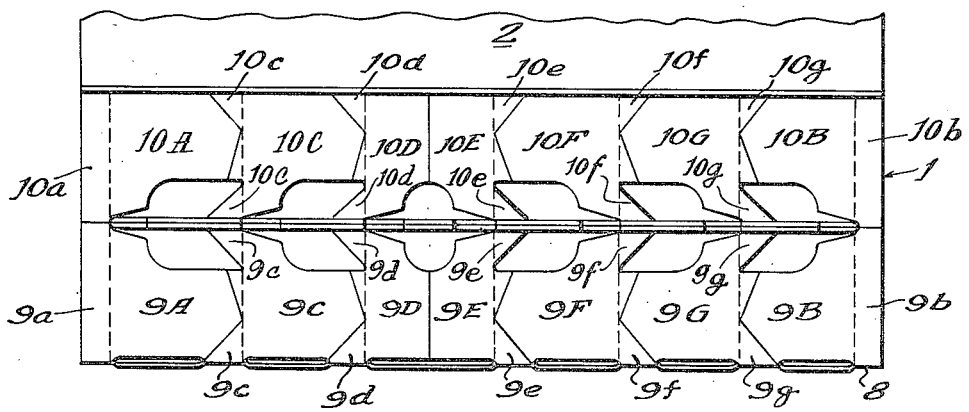
Fig. 21 is a plan view of the carton of Fig. 19 in opened condition but with transverse portion elements unerected.

The top walls 9 and 10 are skeleton walls, a series of foldable elements being partially cut out of the top wall parts to form end walls and transverse partitions. End walls for the front sections of the carton are shown at 9A and 9B, and transverse partitions, as shown from left to right, Fig. 21, are provided at 9C, 9D, 9E, 9F and 9G for the front section of the carton. For the rear section, identical elements, except that they are formed in reverse, are provided at 10A, 10B, 10C, 10D, 10E, 10F and 10G.

The end walls 9A, 10A at the one end of the carton, Figs. 21, 22, 23, 25, are hinged to and integral with flat end portions 9a and 10a of the top wall. At the other end, the end walls 9B and 10B are integral with similar parts 9b and 10b. The intermediate parts 9C and 10C are respectively hinged to and integral with triangular portions 9c and 10c of the skeleton top walls 9 and 10, respectively, and may be folded down to provide transverse partitions. Thus each of the elements 9A and 9B, etc. defines a transverse boundary for an egg cell, each egg cell being bounded by a bottom wall 5 or 7, a partition 6A—6B of double thickness and either a front wall 8 or a rear wall 4 in addition to two of the transverse portions such as, for example, the end wall 9A and the intermediate transverse partition 9C.

Similarly, the elements 9D and 10D are respectively hinged to and integral with triangular portions, 9d and 10d of the skeleton top wall and may be folded down to define transverse partitions; the elements 9E and 10E are similarly attached to tabs 9e and 10e; the elements 9F and 10F are similarly attached to tabs 9f and 10f; and the elements 9G and 10G are similarly attached to tabs 9g and 10g.

The transverse partition elements 9D, 10D, 9E and 10E are somewhat shorter than the other partition elements, inasmuch as each pair of parts 9D, 9E, 10D and 10E are cut from an area of the top wall corresponding to only one cell width of the carton. This construction has certain advantages pointed out in the aforesaid copending application, but it is sufficient merely to note at this point that these elements are somewhat different from the other folding elements cut from the top wall parts 9 and 10.

Figure 20:
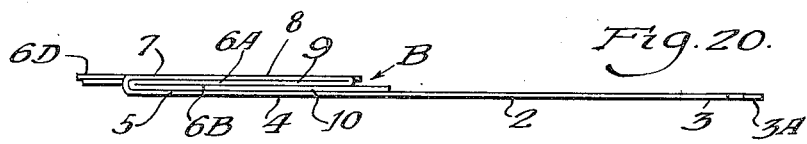
Fig. 20 is an end view of the carton shown in Fig. 19.

Referring to Fig. 20, the collapsed carton is seen in end view as comprising the cover flap portion 2 and flange 3 of single thickness and a portion of four sheets thickness which includes collapsed walls 4 and 5 at the bottom, parts 6B and 10 for the second layer, parts 6A and 9 for the third layer, and parts 7 and 8 for the top layer. The collapsed carton structure, referred to at certain points hereinafter as a blank, is adapted to be fed through the machine of the present invention, as hereinafter described, and means comprising various holding and folding elements are effective to first open up the carton from its collapsed condition until the longitudinal carton wall elements are "squared", that is placed in an angular relation with respect to each other substantially the same as in the fully erected carton. Other means are thereafter effective to move the various elements which are partially cut out of the top wall portions 9 and 10 to their final positions, thus establishing two rows of egg receiving pockets or cells separated longitudinally by one partition wall and separated transversely by five wall elements, plus two end walls, to provide two rows of six cells each so that the erected carton is adapted to receive a dozen eggs.

The carton erecting machine shown in the drawings comprises operating mechanism which is mounted largely between two main side frame members. These main side frame members consist of plates of steel or other suitable material 11 and 12 supporting respectively the opposite end portions of various operating shafts as will be described more fully hereinafter. The plates 11 and 12 are suitably supported on legs in the form of vertically disposed angle members 13, 14, 15 and 16. These leg members are secured to the frame members 11 and 12 in any suitable manner as by means of bolts or studs 18.

As will be described in greater detail hereinafter, the general construction and operation of my novel machine is such that a stack of collapsed carton blanks B may be placed in stored position in a magazine M at station I from which position single carton blanks B are successively and automatically fed, by the machine, from the bottom of the stack through successive erecting stations II, III and IV, indicated in Figs. 1, 8, 9 and 10, and are then automatically discharged from the machine at station V. While passing through stations II, III and IV, each carton blank B is operated on by various carton erecting elements, which will be described in greater detail hereinafter, so that when the carton B leaves station IV and is discharged at station V it has been fully erected.

As is best seen in Figs. 1, 2, 6 and 7, the main side frame members 11 and 12 are maintained in suitable spaced relation by stay bolts or bars 21, 22 and 23. Each of these bolts or bars has reduced end portions which pass through openings in the side frame members, suitable fastening means such as nuts 25 being provided to hold the frames rigidly secured to said bolts. The bolts 21, 22 and 23 therefore constitute transverse frame members. The bolt 21 is located near the right lower corner of the frame members, as seen in Fig. 1, the bolt 22 is located near the upper left end, and the bolt 23 is located near the bottom and toward the left end.

As is best seen in Figs. 1 and 6, two brackets 31 are pivotally supported at intermediate positions on the bolt 23 and carry a plate 32 secured thereto by suitable means such as bolts 33. A drive motor 35 is mounted on the plate 32, being fastened thereto by suitable means such as bolts 36. As is best seen in Figs. 2, 4 and 6, the motor 35 is provided with a drive pulley 37. The pulley 37 is preferably of a variable pitch type with a self adjusting spring, not shown, housed in a housing 37A which projects through an arcuate opening 37B (Fig. 1) in the side frame 11. A belt 38, preferably of V-type, connects pulley 37 in driving relation with a large idler pulley 39 mounted on a main transverse shaft 41. The main shaft 41 is secured against rotation, by means which will be described in detail hereinafter, and the pulley 39 rotates idly on the shaft, a suitable bearing 42 being provided therefor. Pulley 39 is integral with a small pulley 43 provided with a groove for another V-belt 45 which connects pulley 43 in driving relation with a pulley 46. Pulley 46 is mounted on and integral with or firmly secured to a sleeve 47 supported on a shaft 48 carried by the frame members 11 and 12, the pulley 46 and the sleeve 47 being arranged to rotate freely on shaft 48. A small pulley 51 is also secured to the sleeve 47 to rotate with the pulley 46. Another V-belt 52 connects the small pulley 51 in driving relation with a large pulley 53 which is connected to a revolving drum or cage structure 54 which will be described in detail hereinafter.

By means of the drive mechanism just described, the motor 35 is effective to drive the drum or cage 54, supported on main shaft 41, at a relatively slow rate, compared with the motor speed but a rate which provides very large production nevertheless. Pulley 37, through belt 38, drives the large pulley 39 which in turn drives small pulley 43, belt 45, idler pulley 46, small pulley 51, belt 52, and large pulley 53. It will thus be understood that the puley 53, which is directly connected to operating mechanism comprising the rotatable cage structure 54, is driven continuously as long as the motor 35 is in operation. The speed is adjusted by raising or lowering the motor to change the effective pitch of pulley 37. For this purpose a supporting screw 61, best seen in Figs. 1 and 6, is threaded in a suitable bracket 62 carried by an angle bracing member 63 which extends transversely of the machine. By means of screw 61 the motor supporting plate 32 can be pivoted about the stay bolt 23 to raise or lower the motor 35 and thereby adjust the tension on the belt 38, thereby maintaining proper driving relationship between the motor 35 and the first pulley 39.

As is best seen in Figs. 2 and 4, the main shaft 41 extends across the full width of the machine and has its ends mounted in brackets 65 and 66 which are secured to the side frame members 11 and 12, respectively, by suitable fastening means such as screws 67. Each of the bracket members 65 and 66 is keyed to the shaft 41, a hub portion of each bracket being provided with suitable openings for a pin 68 which secures the shaft non-rotatably to the brackets. The shaft 41 supports certain stationary cam elements which will be described more fully hereinafter, and it is important that it be held firmly and rigidly against rotation.

The pulleys 39, 43 and 53 are all mounted on the shaft 41 through the bearing element 42, previously mentioned, and are located at one side of the machine, adjacent to, and just inside, the main frame member 11. The construction is best shown in Fig. 4.

As best shown in Fig. 4, the final drive pulley 53, rotatably mounted on shaft 41 as just described, is secured by means of bolts 71 and spacers 72 to a plate 73 which constitutes one of two side plates or frame members of the revolving cage structure 54, which carries various carton erecting instrumentalities. The plate 73 is preferably of aluminum, but may be of steel or other suitable metal of appropriate thickness. As shown in Fig. 1 it is generally rectangular in shape having the corners cut off to present an octagonal outline. Another plate 75, similar to the plate 73, is similarly mounted on the shaft 41 near the other end thereof, a suitable bearing 76 being provided to support the plate 75 on the shaft 41. Suitable spacing means 77 on the shaft 41 holds the plate 75 spaced from the side frame member 12.

Figure 8:
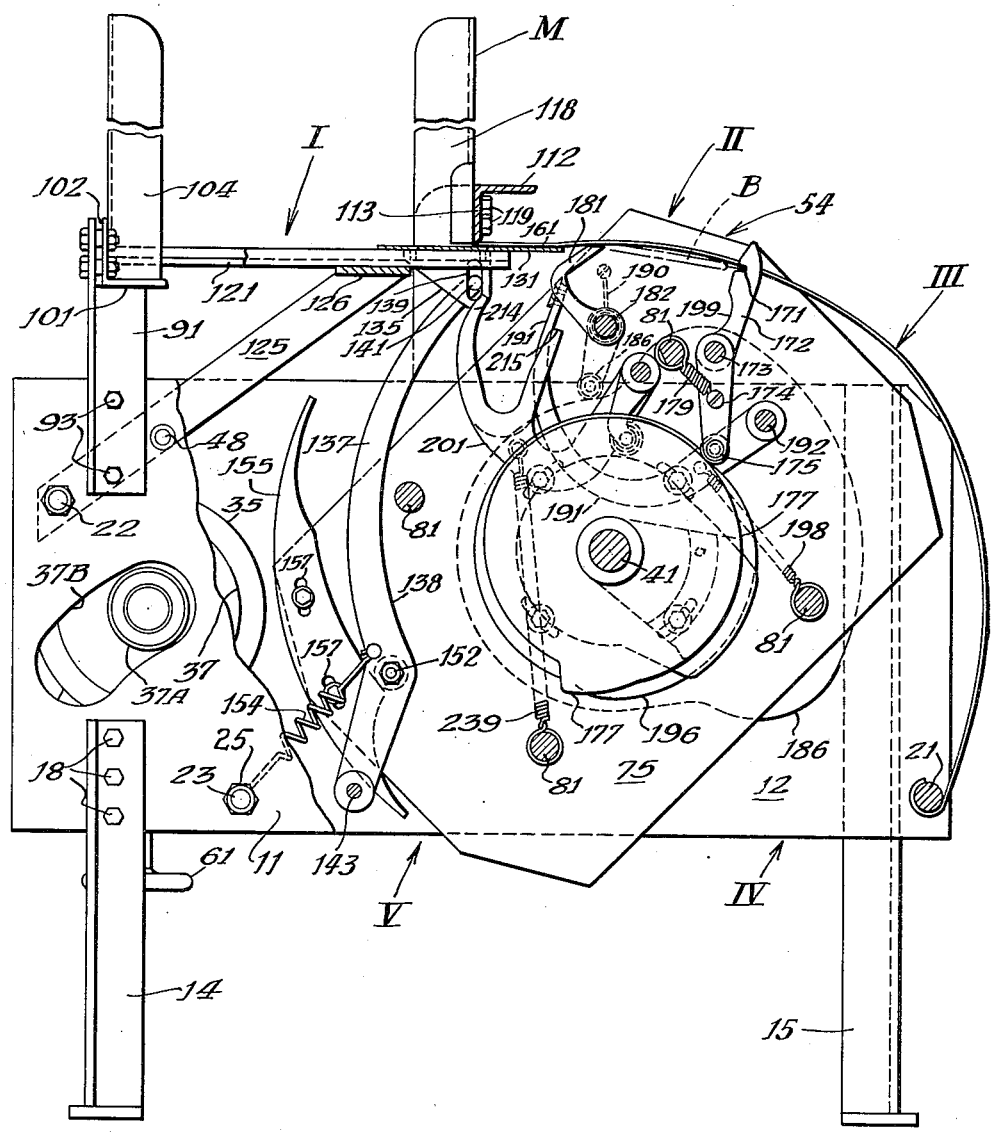
Fig. 8 is a vertical longitudinal section through the machine taken substantially along the line 8—8 in Fig. 2, certain parts being broken away.

The two plates 73 and 75, which thus constitute side frame members or "ends" of the revolving cage structure 54, are maintained in spaced parallel relation by relatively heavy spacing members such as stay bolts 81. These have reduced end portions which pass through suitable openings in each of the plates 73 and 75. The bolts 81 are secured to the plates by suitable fastening means such as nuts 82. There are four of the bolts 81 located in symmetrically opposite positions with respect to the supporting shaft 41 as best shown in Figs. 1, 4 and 8.

The drum cage structure 54 just described, comprising end plates 73 and 75 and the four stay bolts 81, forms a rigid revolving frame work which carries various carton erecting and operating elements about the stationary shaft 41 as pulley 53 is driven by the motor in the manner heretofore described. Various stationary cam elements which will be described presently, are supported by the stationary shaft 41 within or adjacent the cage 54 for operating the erectors and other instrumentalities that are carried around a circular path by the cage structure.

The carton hopper or magazine is supported above the machine by a structural framework carried by the main frame of the machine. As seen in Figs. 1, 2 and 6, two angle bars 91 and 92 projects upwardly from the frame member 11 and are secured thereto by suitable means such as bolts 93. In a similar manner, two other angle bars 95 and 96 project upwardly from, and are secured to, the other main frame member 12 as by bolts 97. A transverse angle member 101 extends horizontally between the upper ends of the angle members or posts 91 and 95, and is connected thereto by bolts 98, to provide a supporting rail for the left end of a stack of collapsed blanks B, as viewed in Fig. 1. The angle bar 101 has a vertical flange 102 to which are secured a pair of upstanding angle members 104 and 105 which are adapted to receive the left corners, as viewed in Fig. 1 of the blanks B. The angle members 104 and 105 constitute guide posts and form elements of the magazine M for the blanks B. These members 104 and 105 are suitably secured to the vertical upstanding flange 102 of the transverse angle member 101 by any suitable means such as bolts 106 as shown in Fig. 6.

The right ends as viewed in Figs. 1 and 2, of the collapsed carton blanks B, which are placed in the magazine M, abut a structure somewhat similar to that just described. Thus an angle member 111 provided with a horizontal flange 112 and a vertical flange 113 has its ends fastened as by bolts 114 to the upper ends of the angle members or posts 92 and 96. Another pair of upstanding angle members 117 and 118 similar to the members 104 and 105, are fastened by suitable means such as bolts 119 to the vertical flange 113 of the angle member 111. The posts 117 and 118 thus constitute corner receiving members for the right corners of the collapsed blanks B, as viewed in Fig. 1, the four posts 104, 105, 117 and 118 defining the corners of the magazine M and serving to maintain the blanks B in proper stacked relationship.

As is best seen in Figs. 1, 2, 3 and 4, the bottom of the magazine M comprises two track members 121 and 123, each having one end thereof secured to the horizontal flange of the transverse angle member 101 by suitable means such as screws 128, each of the track members 121 and 123 being spaced from the horizontal flange of the angle member 101 by a spacing element 122, Figs. 1, 2 and 6. The tracks 121 and 123 extend under the storage area for the cartons B, as seen in Fig. 1, and their other ends are supported by a diagonal bracing member 125 which has its lower end supported at an intermediate point on the main frame stay bolt 22, the forward end of the bracing member 125 being attached to the tracks 121 and 123 through an intermediate plate member 126 secured to the bracing member 125 by screws 127, and by screws 124 to the track elements 121 and 123.

It will be noted that the track members 121 and 123 extend somewhat beyond the right end of the magazine M as viewed in Fig. 1 and are spaced below the lower edge of the vertical flange 113 of transverse angle member 111. A feed plate 131, having a leading edge portion 131a, is mounted on the tracks 121 and 123, and reciprocates thereon during a carton-feeding and carton-erecting operation, as will presently be described.

As is best seen in Fig. 1, the end portions of the track members 121 and 123 extend to the right of the magazine (as viewed in Fig. 1) and, for a purpose which will be described in greater detail presently, are spaced below the lower edge of the vertical flange 113 of transverse angle member 111 a distance greater than the thickness of a carton blank B and less than the thickness of two cartin blanks B. When carton blanks B are stacked in the magazine M they are stacked in such position that the single layer 2-3-4 is on top and the layers 7, 9 and 10 depend therefrom, and so that the single-layer portion 2-3 extends to the left, as viewed in Fig. 1, and the multi-layer portion 7-9-10 extends to the right. It will be noted that with the stack of carton blanks B so positioned in the magazine M, the upstanding angle members 104, 105, 117 and 118 engage the corner portions thereof and maintain the stack in erect position. Also, it will be noted that when the stack of carton blanks B are so positioned in the magazine M and the feed plate 131 is in the position shown in Fig. 1, the single sheet portion 2-3 of the bottom carton blank B rests on the upper surface of the feed plate 131 and the multi-layer portion 7-9-10 projects downwardly in front of the leading edge portion 131a of the plate 131, and rests on the tracks 121 and 123, so that upon movement of the feed plate 131 to the right, as viewed in Fig. 1, the edge 131a thereof will abut the multi-layer portion 7-9-10 and push the bottom carton blank B to the right for purposes which will presently be described in greater detail.

The plate 131 carries a pair of depending ears 135, Fig. 3, which extend downwardly at opposite sides of the track members 121 and 123. These ears 135 are engaged by reciprocating arms 137 and 138 adjacent to the sides of the feed magazine M as best shown in Figs. 1, 3 and 6. Each of the ears 135 is provided with a vertical slot 139 in which a pin 141 carried by each of the arms 137 and 138 is engaged for limited vertical movement.

Each of the arms 137 and 138 is mounted at its lower end on a transverse shaft 143 mounted in the side frame members 11 and 12 of the machine. As shown in Fig. 4 the shaft 143 is provided at the ends thereof with collars 145 which prevent longitudinal displacement of the shaft 143 with respect to the frame members 11 and 12. The arms 137 and 138 are preferably secured to the shaft 143 as by set screws 146 which prevent longitudinal displacement of the arms with respect to the shaft.

At an intermediate point above the supporting shaft 143 each of the arms 137 and 138 is provided with a cam follower in the form of a roller 151 rotatably supported on a bolt or stud 152. This construction is best shown in Figs. 1 and 4. One end of a spring 153 and one end of a spring 154 is attached to each of the arms 137 and 138, respectively, the opposite ends of the springs being attached to the stay bolt 23. These springs tend constantly to rock the arms 137 and 138 counterclockwise, as seen in Fig. 1, about the pivot shaft 143 on which they are mounted.

Each of the side plates 73 and 75 of the revolving cage structure described hereinabove carries a cam element 155, each of which is adapted, upon rotation of the cage structure about the shaft 41, to engage the corresponding one of the cam rollers 151 and draw arms 137 and 138 to the right, or clockwise as seen in Fig. 1, to move the feed plate 131 at appropriate times to feed collapsed cartons from the magazine M into the carton-erecting mechanism to be described hereinafter. The cam elements 155 are adjustably fastened to the plates 73 and 75 by means of studs or bolts 156. Elongated slots 157 are provided in each of the cam elements 155 to permit limited adjustment thereof.

Rocking of the arms 137 and 138 by the cams 155, and the consequent movement of the feed plate 131 to the right, as viewed in Fig. 1, causes the bottom carton of the stack of cartons B in the magazine M to be fed from station I, in magazine M, to station II on the other side of the angle member 111, the lower edge of the vertical flange 113, of the angle member 111, being spaced above the feed plate 131 a distance just sufficient to permit the passage of a single collapsed carton at each feeding operation of the feed plate 131. As is best seen in Figs. 1 and 2, two guide straps 161 and 162, of suitable material such as spring metal, each have one end fastened to the angle member 111 in any suitable manner. These straps 161 and 162 extend above and curve downwardly around the cage structure 54 previously described, the other end of each of the straps 161 and 162 being secured to the stay bolt 21 in any suitable manner. These straps 161 and 162 guide the advancing carton blanks so that they will be within the control of the various operating instrumentalities carried by the revolving cage structure 54, as will be described in greater detail presently. It will be noted that the design of the cam members 155 is such that the arms 137 and 138 are drawn clockwise or to the right as seen in Fig. 1, just long enough to eject a blank B from the magazine into the operating elements carried by the cage structure 54 and then the ends of the cam members 155 ride off from the rollers 151 so that the arms 137 and 138 are released to be withdrawn counterclockwise, as seen in Fig. 1, by the springs 153 and 154. Blanks thus advanced to station II come under the control of holding and ejecting means which will next be described.

The collapsed blanks B, Fig. 8, that are fed out of the hopper or magazine lie just under, and in contact with, the guide straps 161 and 162. Holding and folding means carried by the revolving cage structure tend to hold them against these straps as they travel with the cage or drum, as will presently be described.

Figure 19:
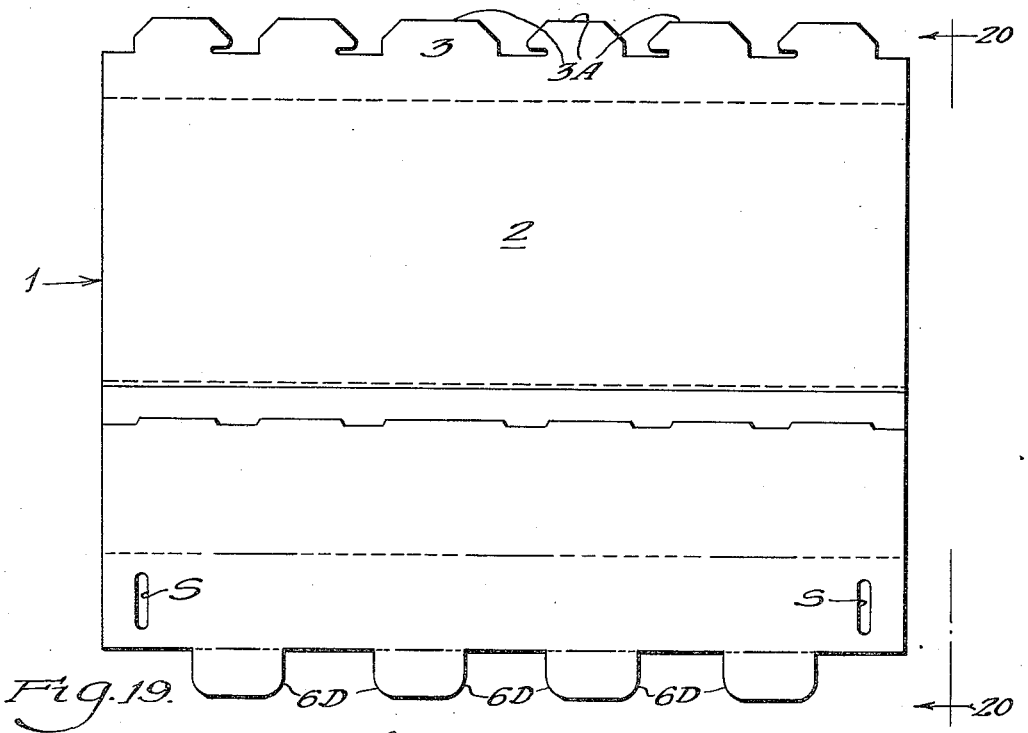
Fig. 19 is a plan view of a collapsed carton of a type suitable for opening and erection in my improved machine.

As is best seen in Fig. 8, when a blank B is advanced under the straps 161 and 162 by the arms 137, 138 and the feed plate 133, from station I to station II, the leading edge of the collapsed carton, which comprises supporting feet elements 6D, Figs. 19 and 20, is advanced so as to project such feet elements 6D into a notch 171 provided in a transverse carton receiving element 172, see Figs. 15 and 16. The member 172 is pivotally mounted between the side plates 73 and 75 of the cage structure by means of a shaft 173 to which the member 172 is non-rotatably keyed as shown in Fig. 16. Shaft 173 carries an arm 174 non-rotatably secured thereto as by a set screw 174a, Fig. 16, and the arm 174 carries a cam follower 175 mounted on a stud or bolt 176. The cam roller 175 is adapted to cooperate with a cam 177, best shown in Fig. 15, which is non-rotatably secured to the shaft 41 by means such as a pin 178. A tension spring 179 connected between arm 174 and one of the stay bolts 81 hold roller 175 against cam 177.

It will be noted that the arm 174, the shaft 173 and the carton receiving element 172 are all secured to and carried by the cage structure 54 and, therefore, move therewith as the cage 54 rotates about the stationary shaft 41 during a carton-erecting cycle of operation. The peripheral contour of the cam 177 is such that as the arm 174, shaft 173 and carton receiving element 172 continue their movement with the cage 54, and move from station II toward station III, the roller 175 on the arm 174 rides up on the raised portion 177a of the cam 177 and thereby rotates the arm 174, the shaft 173 and the carton receiving element 172 in a counter-clockwise direction, as viewed in Fig. 8, relative to the cage 54. This counter-clockwise rotation of the carton receiving element 172 pushes the feet elements 6D of the carton, which are engaged in the notch 171, toward other carton-erecting instrumentalities which will be presently referred to in greater detail.

Also, it will be noted that the elements 6D, engaged in the notch or slot 171 of the carton receiving element 172, not only constitute supporting feet in the erected carton, but they are also integral with the longitudinal middle partition 6A—6B of the carton. Hence movement of the member 172 relative to other carton parts which are held by other elements carried by the revolving cage structure as will be presently explained, tends to push the center partition 6A—6B of the carton to the left, as seen in Figs. 1, 8 and 15, and thus tends to erect the carton.

As soon as the carton feet elements 6D have become engaged in the notch 171, at station II, and before the parts shown in Fig. 15 have moved very far in their clockwise travel about the stationary cam 177, other elements of the machine begin operating to assist in opening the carton.

Two carton opening fingers 181, Figs. 8, 17 and 18, are secured non-rotatably to a shaft 182 mounted rotatably in the side plates 73 and 75 of the revolving cage structure 54. At the end adjacent to the side plate 75, as seen in Fig. 18, the shaft 182 has an arm 183 non-rotatably secured thereto which carries a cam roller 184 at its outer end on a bolt or stud 185. As is best shown in Figs. 2, 5 and 17, a large cam 186 is mounted on the stationary shaft 41 and is stationarily but adjustably secured to the frame element 12 of the machine by four bolts 188 which extend through corresponding arcuate slots 187 formed in the frame 12.

A torsion spring 190, Fig. 8, secured to the shaft 182 holds the cam roller 184 against the peripheral edge of the cam 186, and it will be apparent from a study of Fig. 17, that as the cage structure, carrying the fingers 181, is rotated in a clockwise direction, as viewed in Fig. 17, the cam roller 184 will first ride up on the enlarged portion 186a of the cam 186 and then down therefrom onto the concentric portion 186b, thereby causing the arm 183 and the fingers 181 to be first rotated in a clockwise direction and then a counter-clockwise direction, respectively, for purposes which will be presently explained. The adjustability of the cam 186 on the frame member 12, through the bolt-and-slot connection 187—188, provides for adjustment thereof to vary the time of operation of the fingers 181.

When the fingers 181 are rotated in a clockwise direction, as seen in Fig. 1, during rotation of the cage structure, they first move toward the slot 171 in the carton receiving element 172 and then turn inwardly toward the stationary shaft 41. This relationship can be best seen by a comparison of Figs. 8 and 9. Thus in the station II position shown in Fig. 8, whereat rotation of the fingers 181 about the shaft 182 has not commenced, the fingers 181 merely underlie the top flap 2 of the carton in its collapsed state which extends to the left as seen in Fig. 1. By the time the parts have reached the station III position shown in Fig. 9, the folding or opening fingers 181 have been rotated through a considerable angle to engage the front wall 8 and the top elements 9 of the front half of the carton. Hence, in the position shown in Fig. 9, the fingers 181 have been operated to move the carton front wall 8 a considerable distance away from the cover flap 2.

While the hereinbefore described movement of fingers 181 takes place, and in order to hold the carton against rotation as a whole, with respect to the notch 171, which serves somewhat as a fulcrum or pivot point for some of the folding operations, a pair of holding devices are provided for keeping part of the carton against the guide straps 161 and 162 as best shown in Figs. 13 and 14. These devices comprise two curved arms 191 which are keyed or otherwise non-rotatably secured to a shaft 192 pivotally mounted in the side plates 73 and 75 of the revolving cage structure 54. Each of the curved arms 191 carries a blade element 193 at its free end in a position to engage the carton substantially at the point where the top flap 2 is hinged to the rear wall 4 of the carton and below the guide straps 161 and 162, as best seen in Fig. 9. One of the arms 191 carries a cam roller 194 secured thereto by appropriate means such as a stud or bolt 195. This cam roller 194 is adapted to contact a cam 196 non-rotatably keyed to the shaft 41 as by a key 197, Figs. 4 and 13. As the cage structure 54 rotates clockwise from station II, as seen in Fig. 8, the arms 191 and shaft 192 are rocked clockwise with respect thereto by the cam 196, to advance the blade elements 193 toward the carton and hold them against the straps 161 and 162 as it advances. A tension spring 198, Fig. 13, extends between one of the arms 191 and one of the stay bolts 81 to hold the roller 194 in engagement wtih the cam 196. By this means it will be understood that the rear wall and top flap of the carton are controlled while other folding operations are taking place.

As the parts described above move from station II, as shown in Fig. 8, to station III, as shown in Fig. 9, the carton has been substantially opened to its final form as an inspection of the cross sectional representation shown in dotted lines, Fig. 9, will make clear. During this movement of the carton B, the part which in the normal erected carton, Fig. 25, is the lower front corner between the bottom wall 7 and the front wall 8, is in contact with a concave curved portion 199 of the carton receiving element 172; the back wall 4 and cover flap 2 are substantially in contact with the guide straps 161 and 162; and the front wall 8 is held against a stay bolt 81 of the cage 54 by the carton fingers 181.

Up to the time the parts reach the station III position shown in Fig. 9, the end walls 9A—10A and 9B—10B, and the transverse partitions 9C—10C, etc., which are integral with the top wall portions 9 and 10 of the carton in its collapsed state, are still in the plane of such top wall portions. The structure is therefore tubular and open at both ends with no means to hold or to separate eggs or the like in the two tubular elements. Means which will now be described are next brought into operation to fold the various transverse partitions down into their final positions, not only to complete the folding operation, but also to interlock or engage elements which will be effective to maintain the carton in its desired erected condition.

Referring now to Figs. 11 and 12, it will be noted that four folding devices 201, 202, 203 and 204 are mounted on a shaft 205 for rotation therewith, and are secured thereto by suitable pins 207. Shaft 205 is rotatably mounted in bearing elements 206 carried by the side plates 73 and 75 of the revolving cage. As will be described in greater detail presently, during a carton-erecting operation of my novel machine, the folding device 201 pushes the transverse elements 9B—10B and 9G—10G of the carton blank into erected position; the folding device 202 pushes the transverse element 9F—10F into erected position; the folding device 203 pushes the short transverse elements 9D—10D and 9E—10E into erected position; and the folding device 204 pushes the transverse elements 9A—10A and 9C—10C into erected position.

The folding device 201 carries four fingers 208, 209, 210 and 211 which are operable, during a carton-erecting operation, to press the transverse portions 10B, 9B, 10G and 9G, respectively, of the carton, into final erected position; the folding device 202 carries two fingers 212 and 213 operable to erect transverse portions 10F and 9F, respectively; the folding device 203 carries two fingers 214 and 215, the finger 214 being operable to erect the short transverse portion 9D and 9E and the finger 215 being operable to erect the short transverse partitions 10D and 10E; and the folding device 204 carries four fingers 208', 209', 210' and 211' which are operable to erect transverse portions 10A, 9A, 10C and 9C, respectively, the fingers 208', 209', 210' and 211' on the folding device 204 being similar to, but the reverse of, the fingers 208, 209, 210 and 211, respectively, on the folding device 201.

As is best seen in Fig. 12, the collar portions of each of the four-fingered folding devices 201 and 204, through which the shaft 205 extends, has recesses 217 and 217', respectively, formed therein so that, although the folding devices 201 and 204 are secured to the shaft 205, for rotation therewith by the pins 207, each of the folding devices 201 and 204 may be pivoted about the pins 207, axially of the shaft 205, for a purpose which will be presently described.

Arms 223 and 224 extend from the folding devices 201 and 204, respectively, and, for purposes which will presently be described, carry round headed bolt members 225 and 226, respectively, suitable nuts 225' and 226' being provided for adjustment of the bolts 225 and 226 with respect to the respective arms 223 and 224 which carry them.

A tension spring 227, having one end connected to the collar of the folding device 201 and the other end connected to the collar of the adjacent intermediate folding device 202, is effective to normally yieldingly hold the folding device 201 in normal position, perpendicular to the shaft 205, as shown in Fig. 12. Likewise, a tension spring 228, having one end connected to the collar of the folding device 204 and the other end connected to the intermediate folding device 203, is effective to normally yieldingly hold the folding device 204 in normal position perpendicular to the shaft 205.

As is best seen in Figs. 11 and 12, an arm 236 is secured at one end to the shaft 205, for rotation therewith, by suitable means such as a pin 236a, and a cam follower or roller 235 is secured to the other end of the arm 236. A spring 239, having one end secured to the folding device 203 and the other end secured to one of the stay bolts 81 urges the shaft 205, and, therefore, the arm 236 in a counter-clockwise direction, as viewed in Fig. 11, to thereby yieldingly maintain the roller 235 in engagement with the peripheral edge of a cam 237, which is non-rotatably mounted on the shaft 41 and secured thereto by a pin 238, Figs. 4 and 11.

Referring again to Figs. 8, 9 and 10, it will be noted that by the time the carton to be erected has been advanced from the station II position, shown in Fig. 8 to the station III position, shown in Fig. 9, its front longitudinal wall 8, rear longitudinal wall 4, and the center partitions 6A—6B, have been spaced from each other, that is, the carton has been opened. However, the folding devices 201, 202, 203 and 204, for the transverse partitions 9A and 10A etc. of the carton have not yet been operated. In the station III position shown in Fig. 9, the cam follower or roller 235 carried by the arm 236 secured to shaft 205 has begun to rise on the high portion 237a of the non-rotatable cam 237. Hence, as the cage structure continues to rotate from the station III position, shown in Fig. 9, toward the station IV position, shown in Fig. 10, the shaft 205 and all the folding devices 201, 202, 203 and 204, carried thereby, will be rocked clockwise to insert all the folding fingers carried thereby into the various respective cells of the opened carton to fold down the transverse partitions 9A and 10A etc. into erected position, as previously mentioned.

The end of each of the fingers carried by the folding devices 201, 202, 203 and 204 is suitably tapered so as to properly cam the transverse portions 9A, 10A etc. downwardly during the aforementioned clockwise rotation, as viewed in Fig. 1, of the shaft 205 and the folding devices 201, 202, 203 and 204, so that when the folding devices 201, 202, 203 and 204 have been rotated to the full limit of their travel in a folding operation, the transverse portions 9A, 10A etc. of the carton being erected, are in substantially perpendicular position relative to the bottom walls 5 and 7 of the carton and are in engagement with the side edge portions of the respective fingers carried by the folding devices 201, 202, 203 and 204. At this point in the carton-erecting cycle of operation the bolt 225 carried by the arm 223 engages, and rides onto, a transversely projecting cam lug 240 carried by a cam member 241, which is non-rotatably secured to the shaft 41 by a pin 242, as best seen in Figs. 4 and 17, which thereby causes the folding device 201 to be pivoted in a clockwise direction, as viewed in Fig. 12, upon the pin 207 and against the urging of the spring 227. Likewise, and at the same time, the bolt 226 carried by the arm 224 engages and rides onto a similar projecting cam 240a carried by a cam member 241a which is non-rotatably secured to the shaft 41 by a pin 242a, which thereby causes the folding device 204 to be pivoted in a counter-clockwise direction, as viewed in Fig. 12, on the pin 207 and against the urging of the spring 228.

The aforementioned pivoting of the folding devices 201 and 204 upon the respective pivot pins 207 is effective, through the resulting movement of the fingers 208, 209, 208' and 209', to swing the transverse portions 10B, 9B, 10A and 9A, respectively, laterally outward to the position where the free ends thereof snap into the corresponding slots S, Figs. 19 and 22, formed in the bottom walls 5 and 7 of the carton being erected. Once the end transverse portions 9A—10A and 9B—10B have been snapped into the corresponding slots S, the carton is fully erected, and it will be noted that the end transverse partitions 9A—10A and 9B—10B are firmly held by their engagement with the slots S, and the carton is, therefore, securely held in erected position. Also, it will be noted that, although there may be some residual spring remaining in the intermediate transverse portions 9C—10C etc., it is not sufficient to interfere with the insertion of eggs therebetween during the subsequent loading of the erected carton.

It will be noted that the cam 237 which swings the folding devices 201, 202, 203 and 204, with the shaft 205, about the axis of said shaft, is also provided with side or face cam elements 243 and 244, Fig. 4, which are similar to cams 240 and 240a. For cartons of the type shown in Figs. 19 to 25 they are not needed, but when separable cartons, such as are described in the aforesaid Hall application are to be erected, it is necessary to engage a pair of inner "end" walls, at the line of separation, in slots similar to slots S. This is done in order that the carton may be separated into two complete half cartons. In that case, the folding devices 202 and 203 would be mounted for pivotal movement in the plane of shaft 205, just as the folding devices 201 and 204 are arranged. The cams 243 and 244 would then engage depending elements analogous to parts 223 and 224, if this arrangement was employed, spring means for restoring the folding devices 202 and 203 being suitably arranged as will be obvious.

By the time the traveling cage structure has been rotated to the station IV position shown in Fig. 10, all folding and setting up operations on the carton being erected have been completed.

The roller 235 on the arm 236 then rides down off from the raised portion 237a of the stationary cam 237 onto the concentric portion 237b thereof, and, hence, the spring 239 causes the folding devices 201, 202, 203, 204, on the shaft 205, to rotate in a counter-clockwise direction, as viewed in Fig.

11, and thereby be drawn out of engagement with the erected carton. The roller 184 on the arm 183 then rides down off from the raised portion 186a of the cam 186 onto the concentric portion 186b thereof, so that the fingers 181 are rotated in a counter-clockwise direction, as viewed in Fig. 10, by the spring 190, out of engagement with the front side wall 8 of the carton; and the roller 194 on the arm 191 rides off from the raised portion 196a on the cam 196 onto the concentric portion 196b thereof, so that the arm 191 is rotated in a counter-clockwise direction, as viewed in Fig. 13, and the blade element 193 carried thereby is moved out of engagement with the top side 2 of the erected carton.

At this time, the rotation of the cage structure has carried the erected carton past the shaft 21 and the ends of the guide straps 161 and 162, and, the other folding devices and holding devices having been moved out of engagement with the erected carton as hereinbefore discussed, the only device holding the erected carton in the cage structure is the carton receiving element 172, the downwardly projecting legs 6D of the carton being engaged in the notch 171 thereof. Upon continued rotation of the cage structure toward station V, the roller 175 on the arm 174 rides off from the raised portion 177a of the cam 177 onto the concentric portion 177b thereof, permitting the carton receiving device 172 to rotate relative to the cage 54 in a clockwise direction, as viewed in Fig. 10, and, also, continued rotation of the cage structure 54 causes the receiving device 172 to be carried around to the station V position, whereat the erected carton depends from the carton receiving device 172 and, in which position, the carton will fall by gravity from engagement with the retaining device. If it is desired to do so, a wiper device (not shown) may be suitably secured to the frame of the machine so as to engage the erected carton at station V and knock it out of engagement with the receiving device 172. However, the latter is optional, and I have found that permitting the erected carton to fall by gravity, alone, from the receiving device is satisfactory. In either case, the carton may drop into a suitable receptacle or preferably onto a conveyor, not shown, by which it is carried to a discharge point or to a filling station for further handling.

It will thus be understood that during each complete rotation of the cage structure 54 of my machine shown in the accompanying drawings, a carton is withdrawn from the magazine M and is opened and fully erected. The sequence of opening and erecting operations is substantially as follows, although it may be varied somewhat if desired. A stack of cartons in collapsed condition is placed in the magazine M, or, in other words, at station I, and the motor is turned on to rotate the cage structure and operate the feeder. Assuming first that the parts are in the position shown in Fig. 1, a carton has just been discharged at station V, Fig. 1 representing a position just a little further advanced in the cycle than that shown in Fig. 10. As the cage structure 54 revolves further, the cams 155 engage the cam rollers 151 and swing the arms 137 and 138 clockwise about their pivots 143, as viewed in Fig. 1. This causes a collapsed carton B to be ejected from station I position in the magazine, to station II position beneath the guide straps 161 and 162, and on top of the rotating drum or cage. The flange 113 of angle member 111 prevents the feeding out of more than one carton at a time.

The carton is advanced toward station II by feed plate 131 under the straps 161 and 162, being supported in such advance by the ends of the fingers 181 until the feet portions 6D are inserted into the notch or slot 171 of the holding member 172 This position is shown in Fig. 8. On further rotation of the drum the carton is advanced to station III, the fingers 191 rotating to hold the carton against the straps or tapes 161 and 162, and the opening fingers 181 rotating through a considerable angle to the position shown in Fig. 9, to engage the front wall 8 of the carton and draw it away from the parts held by the fingers 191. This opens the carton quite fully and prepares it for the insertion thereinto of the fingers of cross wall folding devices 201, 202, 203 and 204, carried by the shaft 205.

The next operation is for the four groups of cross wall folding devices 201, 202, 203 and 204 to be rotated and the fingers thereof inserted into the respective cells provided for eggs during the further advance of the carton from station III to station IV. As the fingers of the folding devices 201, 202, 203 and 204 are inserted they of course fold the transverse partitions and end walls 9A—10A, etc. down into substantially vertical planes with respect to the carton structure and after such insertion of the fingers has been substantially completed, the folding devices 201 and 204 are moved toward the ends of the carton, as previously described, to interlock or engage the end wall members 9A—10A and 9B—10B with the slots S in the bottom 5—7 of the carton. This completes the setting up operations and the folding devices 201, 202, 203 and 204, the arms 191 and the fingers 181 are next withdrawn. The carton finally is dropped out of the machine after the various folders and holding means are retracted, and the cage 54 continues to revolve and picks up the next carton from the magazine M and repeats the above described carton-erecting cycle of operation on it. This cycle of operation may be repeated automatically as long as a supply of cartons remains in the magazine M, the machine automatically feeding the bottom carton from station I, erecting it during the passage thereof from station II to station IV and discharging it at station V.

The operating speed of my machine may be varied by adjustment of hand screw 61 which raises or lowers the motor. The effective pitch diameter of pulley 37 is adjusted automatically by the tension on belt 38 and by the spring means in the housing 37A. The slot 37B in the frame permits a relatively wide range of adjustment.

All of the operating elements that are controlled by stationary cams have suitable spring means for holding the cam follower means in engagement with their respective cams. Thus tension spring 179 controls the receiving device 172, torsion spring 190 controls the carton opening fingers 181, tension spring 196 controls the holding arms 191, and tension spring 239 controls the group of folding devices 201, 202, 203 and 204, which erect the transverse partitions and end walls of the carton. Because of the angle through which the carton opening fingers 181 are rotated, a torsion spring is preferably employed for shaft 182.

The springs 227 and 228 for rocking the folding devices 201 and 204, and associated parts, have been previously described. It will be understood that these springs will be of the compression type when positive cam operation of the folders is desired to engage the carton end walls 9A, 10A and 9B, 10B in slots S of the carton bottom. Springs 153 and 154, which return the carton feed mechanism after operation of cams 155 has been completed, have been referred to above. Suitable bumpers, not shown, may be provided to prevent excessive noise or vibration as these springs return arms 137 and 138 to the left positions, as seen in Fig. 1.

It will be understood that although for the purpose of illustrating my invention, I have shown a carton-erecting machine that erects only one carton for each complete revolution of the drum 54 that this is only by way of illustration and not by way of limitation thereto and that if desired by novel machine can be constructed to erect more than one carton during each revolution of the drum 54 without departing from the purview of my invention. For example, it will be apparent to those skilled in the art, that my machine may readily be constructed for erecting two cartons during each complete revolution of the drum 54, by mounting two sets of cams 155 and two sets of carton-erecting and carton holding fingers opposite to each other on the drum 54 so that a carton would be fed from the magazine M and erected during each 180° of rotation of the drum 54.

Hence, while I have illustrated and described the preferred embodiments of my invention, it is to be understood that these are capable of variation and modification and I therefore do not wish to be limited to the precise details set forth, but desire to avail myself of such changes and alterations as fall within the purview of the following claims:

I claim:

1. In a machine for setting up cellular cartons, a feeder for collapsed cartons, a movable structure adapted to receive collapsed cartons from said feeder, wall separating means carried by said structure, partition engaging means carried by said structure, and cam means for operating both said means.

2. In a machine for erecting partitioned cartons from collapsed blanks, a feeder for collapsed blanks, a rotatable cage structure adapted to receive collapsed blanks from said feeder, means carried by said structure for separating walls of said collapsed blanks, means carried by said structure for moving partition elements of said blanks into erected positions, and cam means for operating both said means.

3. In a machine for erecting partitioned cartons from collapsed blanks, a feeder for collapsed blanks, a rotatable cage structure adapted to receive collapsed blanks from said feeder, means carried by said structure for separating walls of said collapsed blanks, means carried by said structure for moving partition elements of said blanks into erected positions, and stationary cams within said structure for operating both said means.

4. In a machine for erecting cartons, the combination which comprises a magazine for collapsed carton blanks, a reciprocating feeder for removing said blanks singly from said magazine and advancing them, a rotatable drum structure including a holder for receiving an element of said blanks, wall distending means carried by said structure, folding means carried by said structure, and cams within said structure for operating said distending and folding means in timed relation to each other to thereby separate walls of said blanks and move partition elements of said blanks into erected position between said walls.

5. In a machine of the character described, the combination which comprises a reciprocating feeder for collapsed carton blanks, a continuously rotating drum, a carton receiver movably mounted on said drum, a carton opener movably mounted on said drum, a folding device movably mounted on said drum, and stationary cam means within said drum for moving said receiver, said opener, and said folding device with respect to said drum and relative to each other to thereby open said carton and move partition walls in said carton into erected position.

6. In a carton erecting machine, the combination of a magazine for holding a supply of collapsed cartons, a feeder for advancing said cartons singly from said magazine, a revolving cage including a carton holder and a carton opener, and means within said cage for operating said holder and said opener.

7. In a carton erecting machine, the combination of a magazine for holding a supply of collapsed cartons, a feeder for advancing said cartons singly from said magazine, a continuously revolving cage including a carton holder and a carton opener, and cam means positioned within said cage for operating said opener.

8. In a carton erecting machine, the combination of a continuously revolving cage, means carried by said cage for holding a collapsed carton, a carton opener carried by said cage, a carton partition erecting mechanism, and cam means for operating said opener and said mechanism.

9. In a carton erecting machine, the combination of a continuously revolving cage, means carried by said cage for holding a collapsed carton, a carton opener carried by said cage, a partition erecting mechanism including a finger for each partition, and means for operating said opener and said mechanism.

10. In a machine for erecting collapsed cartons, the combination of feeding means for collapsed cartons, a revolving cage, a notched holder for receiving and holding projecting portions on the bottom of said carton while said carton is being opened, means for engaging the inner side walls of said carton and separating them to open said carton, said cage carrying said notched holder and said wall engaging means, and means within said cage mounted independently thereof for actuating said wall engaging means to open said carton.

11. The combination recited in claim 10 wherein means are provided for erecting cell-separating partitions within said carton.

12. In a machine for erecting collapsed cellular cartons, the combination of feeding means for said collapsed cartons, a revolving cage, a notched holder for receiving and holding projecting elements on the bottom of said carton while said carton is being opened, separate means for engaging inner surfaces of two opposed elements of said carton to open said carton, partition erecting elements for cell-separating partitions, said holder, said separate means, and said partition erecting elements being supported on and carried by said cage, and means within said cage and supported independently thereof for operating said holder, said separate means and said partition-erecting elements.

13. In a machine for erecting cartons, the combination of means for supplying collapsed cartons automatically to an erecting station, a cam operated holding mechanism at said station for holding a part of a collapsed carton, a folder for distending collapsed walls of said carton, and a finger structure for entering between said distended walls to fold transverse partition elements into carton sustaining positions between said distended walls, said mechanism, folder and finger structure being rotatably mounted on a common axis and being rotatable around said axis during an erecting operation.

14. In a machine for erecting cartons, the combination of means for supplying collapsed cartons automatically to an erecting station, a revolving drum structure at said station, and carton holding mechanism, a folder for distending collapsed carton walls, and a finger structure for folding partition walls between said distended walls all carried by said drum structure.

15. In a machine for erecting collapsed egg cartons, a continuously traveling drum structure, carton holding and opening elements carried by said structure, a fingered folder for folding transverse partitions into position between longitudinal carton walls to maintain a spaced relation between said carton walls and to complete erection of a carton opened by said holding and opening means, said fingered folder being also carried by said structure.

16. In a machine for erecting collapsed egg cartons, a continuously traveling drum structure, carton holding and opening elements carried by said structure, a fingered folder also carried by said structure for folding transverse partition elements into position between longitudinal carton walls to maintain a spaced relation between said walls and to complete erection of a carton opened by said holding and opening means, and stationary cam mechanism for operating said holding and opening means and said folder.

17. In a machine of the character described, a carton folding mechanism comprising a stationary shaft, cam elements rigidly secured to said shaft, a drum structure rotatably mounted on said shaft, folding elements carried by said drum structure, and cam followers carried by said folding elements for cooperation with said cam elements.

18. In a machine of the character described, a stationary shaft, cam elements fixed to said shaft, a drum structure comprising a pair of end plates rotatably supported on said shaft, and carton opening and erecting means mounted in said end plates and operated by said cam elements for opening and erecting collapsed egg cartons.

19. In a machine of the character described, a revolving drum, carton feeding means, carton folding means carried by said drum, cam means carried by said drum for operating said feeding means, and stationary cam means for operating said folding means.

20. In a machine of the character described, a revolving drum, carton feeding means, carton opening and erecting means carried by said drum, cam means moving with said drum for operating said feeding means, stationary cam means for operating said opening and erecting means, and supporting means for said cam means, said supporting means including adjustable clamping means engageable with predetermined ones of said cam means in a plurality of predetermined positions in such manner that the position of said predetermined cam means may be angularly adjusted for varying the timing of the operations effected thereby.

21. A folding device for erecting transverse partitions within an egg carton, comprising a rotatably mounted shaft and a folder secured to said shaft for rotation therewith and mounted for limited pivotal movement in the plane of said shaft.

22. A folder for erecting transverse partitions within an egg carton, comprising a rotatably mounted shaft, a pair of finger members secured to said shaft for rotation therewith and mounted for limited pivotal movement in the plane of said shaft, and resilient means for urging said members to limiting pivotal positions.

23. In a machine of the character described, the combination of a notched holding bar for a projecting element of a collapsed carton, guide straps for limiting the movement of carton elements from a center of rotation, finger elements for holding a carton part against said straps, other finger elements for separating another part of a collapsed carton from said first named part to open said carton, and folding fingers for moving transverse partition elements of said carton between said separated parts to complete the erection of said carton.

24. In a machine of the character described, the combination of a holding bar, a guide strap, a finger for holding an element of a carton against said guide strap, and another finger for moving another element of said carton away from said first named element to open said carton.

JOSEPH VINCENT FERRARO.

REFERENCES CITED

The following references are of record in the file of this patent:

UNITED STATES PATENTS

| Number | Name | Date |
|---|---|---|
| 741,467 | Donnelly | Oct. 13, 1903 |
| 1,218,861 | Heywood et al. | Mar. 13, 1917 |
| 1,275,759 | Russell | Aug. 13, 1918 |
| 1,439,536 | Andrews et al. | Dec. 19, 1922 |
| 2,018,396 | Burger | Oct. 22, 1935 |
| 2,479,994 | Annen | Aug. 23, 1949 |